United States Patent [19]
Nanjo

[11] Patent Number: 5,424,869
[45] Date of Patent: Jun. 13, 1995

[54] ZOOM LENS

[75] Inventor: Yusuke Nanjo, Kanagawa, Japan

[73] Assignee: Sony Corporation, Japan

[21] Appl. No.: 87,102

[22] Filed: Jul. 1, 1993

[30] Foreign Application Priority Data

Jul. 22, 1992 [JP] Japan .................................. 4-194405

[51] Int. Cl.⁶ .............................................. G02B 15/14
[52] U.S. Cl. ..................................... 359/687; 359/713
[58] Field of Search ................ 359/687, 713, 683, 708

[56] References Cited

U.S. PATENT DOCUMENTS

| 5,100,223 | 3/1992 | Ono et al. ........................... 359/683 |
| 5,221,994 | 6/1993 | Nishio ................................. 359/687 |
| 5,321,552 | 6/1994 | Horiuchi et al. ..................... 359/687 |
| 5,353,157 | 10/1994 | Horiuchi ............................. 359/687 |

FOREIGN PATENT DOCUMENTS 239011 2/1990 Japan .

Primary Examiner—Scott J. Sugarman
Attorney, Agent, or Firm—Ronald P. Kananen

[57] ABSTRACT

An inner focus type zoom lens is a nine lens system including third, fourth and seventh lenses which are plastic lenses including aspherical surfaces, and first, second, fifth, sixth, eighth and ninth lenses which are spherical glass lenses. This zoom lens system can reduce the manufacturing cost by employing the plastic lenses and eliminating aspherical glass surfaces. Moreover, this zoom lens system is superior in correction of aberrations and less susceptible to temperature changes.

7 Claims, 8 Drawing Sheets

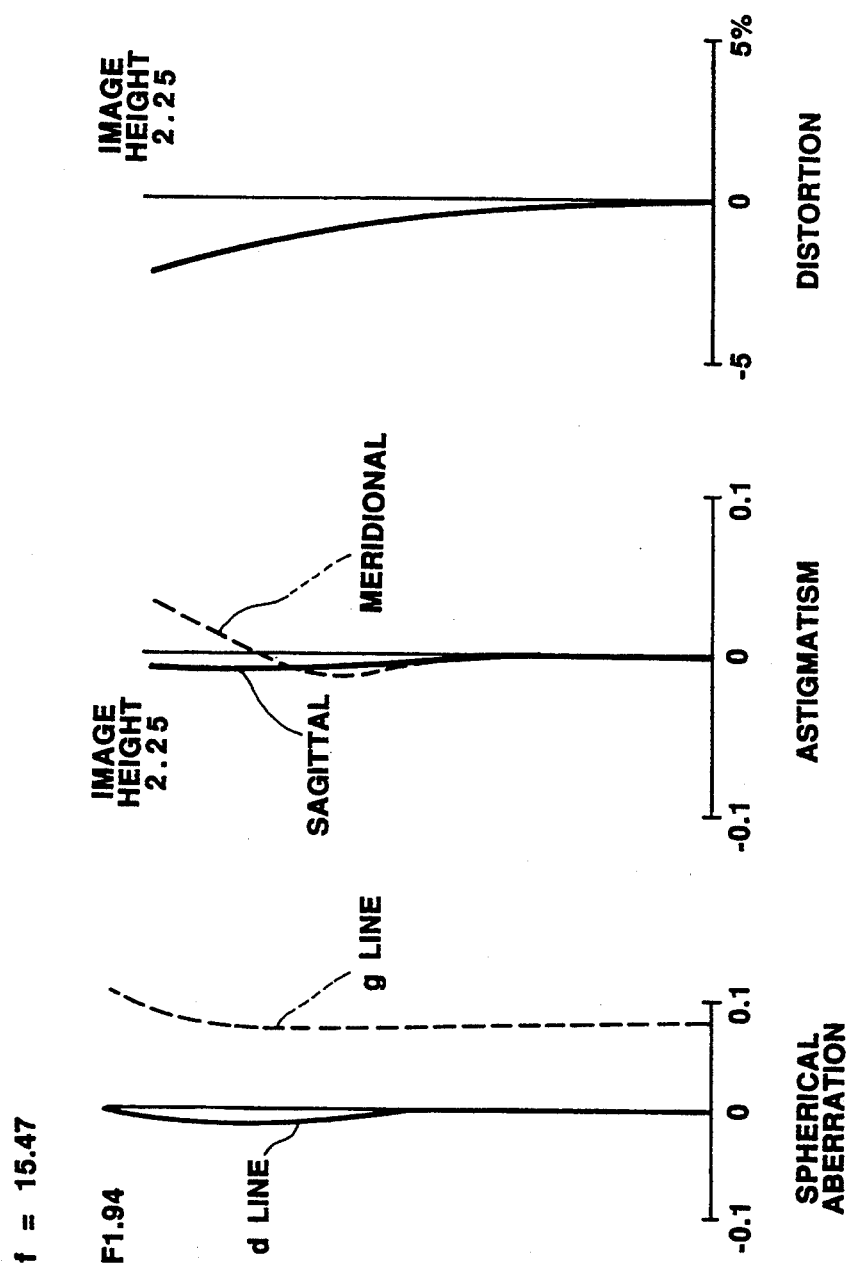

FIG.8A f = 30.74

F2.09 g LINE d LINE

SPHERICAL ABERRATION

FIG.8B

IMAGE HEIGHT 2.25

MERIDIONAL

SAGITTAL

ASTIGMATISM

FIG.8C

IMAGE HEIGHT 2.25

DISTORTION

ZOOM LENS

BACKGROUND OF THE INVENTION

The present invention relates to a zoom lens which can be used in an inner focus type video camera.

Recently, an inner focus type zoom lens has been developed and put to practical use. In this type, an element lens such as a compensator or a master lens is shifted minutely along the optical axis for focusing. One example of such an inner focus type zoom lens, used mainly for a video camera, is constituted by four lens groups including an aspherical lens to reduce the number of constituent lenses. (A similar zoom lens is disclosed in Japanese Patent Provisional Publication No. Hei2-39011.)

In the conventional inner focus type zoom lens, aspherical surfaces are formed by glass mold, or by complex aspherical surfaces. However, aspherical surfaces are difficult to manufacture and increase the manufacturing cost. Because of this cost increase, the conventional zoom lens is unsatisfactory in cost reduction as a whole, despite the reduction in the number of the required lenses. The use of one or more plastic lens is effectual for cost reduction. This measure for cost reduction is difficult, however, since there are restriction of the refractive index and Abbe number, difficulties in forming process, and a problem of a focus displacement due to a temperature change.

SUMMARY OF THE INVENTION

It is an object of the present invention to provide a zoom lens which is advantageous in cost reduction, superior in correction of aberrations and resistant to temperature changes A zoom lens according to the invention comprises first, second, third and fourth lens groups. The first and third groups are stationary relative to an image plane, and the second and fourth groups are movable. The second group is moved to obtain a variable power, and the fourth group is moved for focusing.

The first lens group has a positive refracting power, and comprises a cemented convex lens of a concave first lens and a convex second lens, and a convex third lens.

The second lens group has a negative refracting power, and comprises a concave fourth lens, and a cemented concave lens of a concave fifth lens and a convex sixth lens.

The third lens group has a positive refracting power, and comprises a convex seventh lens.

The fourth lens group has a positive refracting power, and comprises a cemented convex lens of a concave eighth lens and a convex ninth lens. These first through ninth lenses are arranged along the optical axis in order from the object side toward the image side.

In this zoom lens, each of the third, fourth and seventh lenses is made of plastic material.

In this lens system, it is possible to form aspherical surfaces only in the plastic lenses, and to make the remaining six lenses spherical glass lenses. Therefore, the present invention can provide a zoom lens which is advantageous in cost reduction and superior in performance.

BRIEF DESCRIPTION OF THE DRAWINGS

FIGS. 3A, 3B and 3C are graphs showing aberration curves of the zoom lens shown in FIG. 1, when the focal length f of the zoom lens is 15.47.

FIGS. 8A, 8B and 8C are graphs showing aberration curves of the zoom lens shown in FIG. 5, when the focal length f of the zoom lens is 30.74.

DETAILED DESCRIPTION OF THE INVENTION

Figure 1:
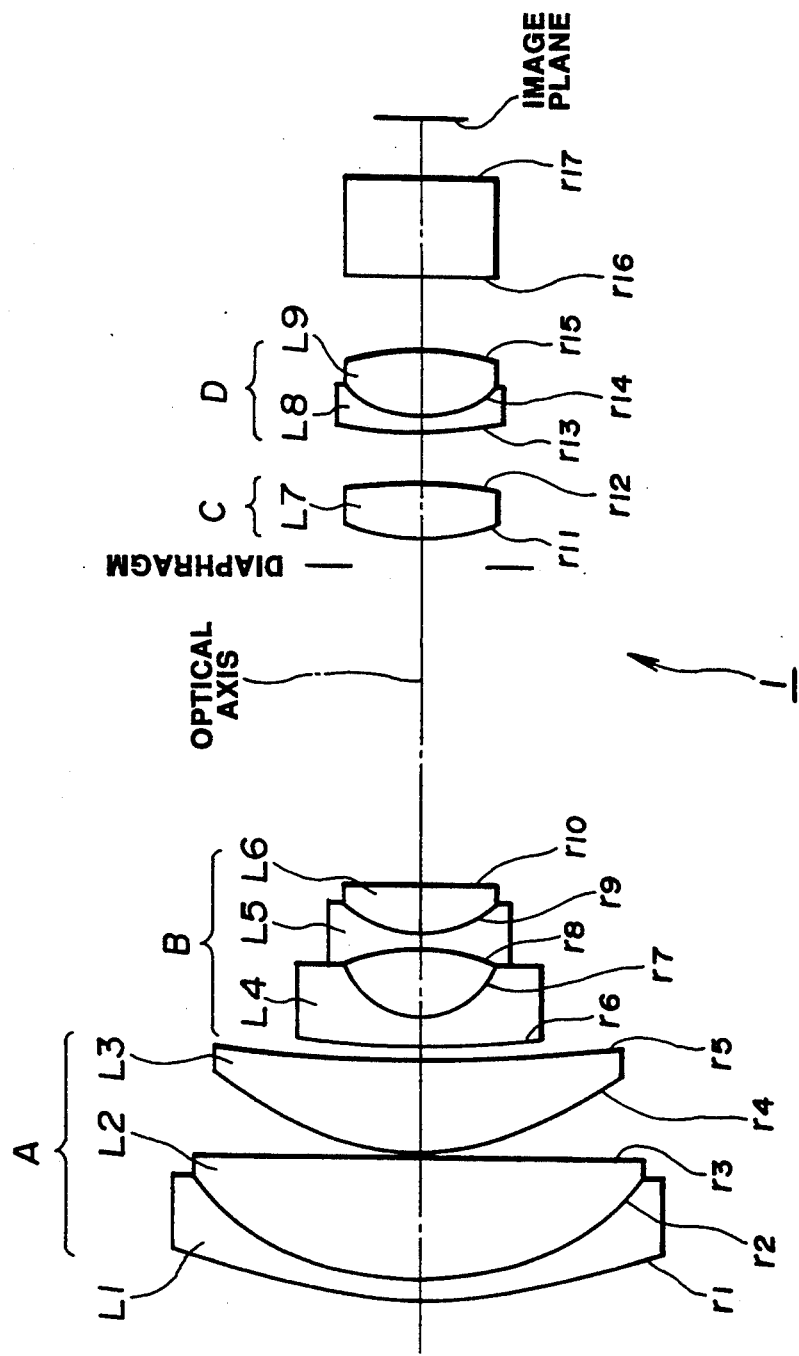
FIG. 1 is a schematic view showing a zoom lens according to a first embodiment of the present invention.

FIG. 1 shows a zoom lens 1 according to a first embodiment of the present invention. This zoom lens can be used in a video camera of an inner focus type.

The zoom lens 1 is a system of lenses, which includes a first lens group A of a positive refracting power, a second lens group B of a negative refracting power, and third and fourth lens groups C and D of positive refracting powers. The first, second, third and fourth groups A, B, C and D are arranged in order from the object's side. The first group A is closest to the object, and the fourth group D is closest to an image plane. The first and third lens groups A and C are fixed stationary relative to the image plane. A variable power is obtained mainly by moving the second lens group B. The fourth lens group D is moved for performing compensation for a focus shift of zooming, and focusing.

As shown in FIG. 1, the first lens group A includes a cemented convex lens consisting of a first lens L1 which, in this embodiment is a negative meniscus lens with a convex object side surface and a second lens L2 which is either a plano-convex lens or a bi-convex lens (see the second embodiment illustrated in FIG. 5), and a third lens L3 which is a positive meniscus lens with a convex object side surface. The first lens L1 is closest to the object, and the second lens L2 is placed between the first and third lenses L1 and L3.

The second lens group B is placed immediately behind the first group A, and includes a fourth lens L4 which is a negative meniscus lens with a convex object side surface, and a cemented lens comprised of a bi-concave fifth lens L5 and a plano-convex sixth lens L6. The second lens group B is between the first lens group A and a diaphragm (or stop).

The third lens group C is placed behind the diaphragm. The third lens group C of this example includes only a plano-convex or a bi-convex seventh lens L7.

The fourth lens group D includes a cemented convex lens consisting of a eighth lens L8 which is negative meniscus lens with a convex object side surface and a bi-convex ninth lens L9.

The third, fourth and seventh lenses L3, L4 and L7 are made of plastic.

In this lens system, it is difficult to employ a cemented lens of a glass lens and a plastic lens cemented together because the glass and plastic sharply differ in thermal expansion coefficient. The strain in a surface of the plastic lens would be increased at high or lower temperatures, and an abrupt temperature change would cause separation of the cemented lens surfaces of the two different materials. The lens system shown in FIG. 1 includes the three cemented lenses, each of which has a cemented interface of a sharp curvature. If one or more of these cemented lenses were replaced by separate single lenses to employ a plastic lens, then the separated lens surfaces would counteract the effects of aberrations, and the performance of the lenses would be sensitively affected by manufacturing errors. Therefore, it is dangerous to replace a sensitive component by a plastic lens which is difficult to form accurately. In the lens system shown in FIG. 1, the third, fourth and seventh lenses L3, L4 and L7 are plastic lenses and the remaining six lenses (L1, L2, L5, L6, L8 and L9) are glass lenses. This lens system can decreases the manufacturing cost safely.

In this lens system, moreover, aspherical surfaces are formed only in the plastic lenses, and the glass lens surfaces are all made spherical. This system can further reduce the manufacturing cost by utilizing the aspherical plastic surfaces which are relatively easy to form, and the spherical glass surfaces which are much easier to grind and polish than the aspherical glass surfaces.

Each lens has a front (or first) surface on the object side and a back (or second) surface on the image side. In this embodiment of the invention, at least the back surface r7 of the fourth lens L4, and the back surface r12 of the seventh lens L7 are made aspherical so that the curvature is made more gradual than that of a paraxial spherical surface as the radial distance from the optical axis increases. These aspherical surfaces are used to correct the aberrations.

In general, a spherical glass lens having a high refractive index is used as the fourth lens L4 in a conventional system. The replacement of this by a plastic lens having a low refractive index increases barrel distortion mainly on a wide angle side due to a too sharp curvature, so that bending of an image to an over side can not be corrected. In the lens system of this embodiment, the image side back surface r7 of the fourth plastic lens L4 is such an aspheric surface that the curvature at a point decreases as the distance of the point from the optical axis increases. This aspheric plastic surface has an effect equivalent to that obtained by decreasing the curvature of a high refractive index glass lens. The aspheric plastic surface r7 can prevent increase of the aberrations.

The seventh lens L7 is used to make substantially parallel the rays which are diverged by the second lens group B. A spherical single lens cannot avoid an increase of the spherical aberration on an under side. In the lens system shown in FIG. 1, however, this aberration is prevented by using the image side, aspherical surface r12 of the seventh lens L7 in which the curvature at a given point decreases as the radial distance of the point from the optical axis increases.

An aspherical lens surface is defined by the following mathematical expression:

$$xi = \frac{H^2}{ri}\left\{1 + \left(1 - \frac{H^2}{ri^2}\right)^{\frac{1}{2}}\right\}^{-1} + BiH^4 + CiH^6 + DiH^8 + EiH^{10}$$

Equation 1 where xi is a depth of a curved surface of an ith surface, H is a distance from the optical axis, Bi, Ci, Di and Ei are coefficients of asphericity of the ith surface.

The following table 1 shows values of the asphericity coefficients Bi, Ci, Di and Ei of the image side surface r7 of the fourth lens L4 and the image side surface r12 of the seventh lens L7 employed in the lens system of this example.

TABLE 1

| Aspherical Coefficients | Bi | Ci | Di | Ei |
| --- | --- | --- | --- | --- |
| r7 surface | $-2.0 \times 10^{-4}$ | $-7.9 \times 10^{-5}$ | $+8.1 \times 10^{-6}$ | $-5.6 \times 10^{-7}$ |
| r12 surface | $+4.4 \times 10^{-4}$ | $+7.5 \times 10^{-7}$ | 0 | 0 |

In general, it is difficult to employ one or more plastic lenses in the first or second lens group A or B since the use of a plastic lens increases the focus shift due to temperature change specifically on the telescopic side. The lens system of this embodiment is arranged to minimize this disadvantage, and facilitate the lens forming process, as follows:

The third and fourth lenses L3 and L4 are made of the same material, and at the same time the following three conditions (1)~(3) are satisfied.

(1) $0.4 < \frac{fA}{f3} < 1$ (2) $0.4 < \frac{fB}{f4} < 1$ (3) $0.7 < \frac{f3 \cdot fB}{f4 \cdot fA} < 1.4$ In these inequalities, fA is a focal length of the first lens group A, fB is a focal length of the second lens group B, f3 is a focal length of the third lens L3, and f4 is a focal length of the fourth lens L4.

If the refracting power of a plastic lens is made weak, it is possible to lessen the influence of a temperature change on a focus shift, and improve the accuracy in the lens forming process by reducing a partial thickness difference.

The above-mentioned first condition (1) relates to the share of the refracting power of the third lens L3 in relation to the refracting power of the whole of the first lens group A. Above the upper limit, the partial thickness difference of the third lens L3 increases, so that holes tend to occur during the lens forming process, and it becomes difficult to form accurate lens surfaces. Moreover, a great refracting power increases the influence of a temperature change on a focus shift. Below the lower limit, on the other hand, the refracting power of the cemented lens of the first and second lenses L1 and L2 is too strong, so that it is difficult to correct the spherical aberration, astigmatism and distortion on the telescopic side.

The second condition (2) relates to the share of the refracting power of the fourth lens L4 in the refracting power of the second lens group B. The excess above the upper limit incurs the same problem as in the case of the first condition. Below the lower limit, the refracting power of the cemented lens of the fifth and sixth lenses L5 and L6 is so strong that the barrel distortion is increased on the wide angle side, and the curvature in the image plane increases toward the over side, making the correction difficult.

The third condition (3) is designed to cancel the focus shift due to a temperature change in a balanced manner after the powers of the third and fourth lenses L3 and L4 are adequately weakened in accordance with the conditions (1) and (2). If the ratios in the first and second expressions (1) and (2) are close to one, it is possible to decrease the focus shift to a small level by counterbalancing.

The following tables 2 and 3 show a concrete example according to the first embodiment of the invention. In this example, PMMA (acrylic resin) is used as plastic lens material.

invention can provide the inner focus type zoom lens which is superior in image error correction, and less susceptible to temperature changes.

Among the nine lenses L1–L9, the three lenses L3, L4 and L7 are made of plastic, and the remaining six L1, L2, L5, L6, L8 and L9 are all spherical glass lenses. This design can significantly reduce the cost of the whole of the zoom lens 1. Furthermore, it is possible to choose a shape which is less susceptible to defects in the forming process, and which is easy to accurately manufacture. The two plastic lenses L3 and L4 in the first and second lens groups A and B can minimize the adverse influence of temperature changes on the position of the focus.

Figure 5:
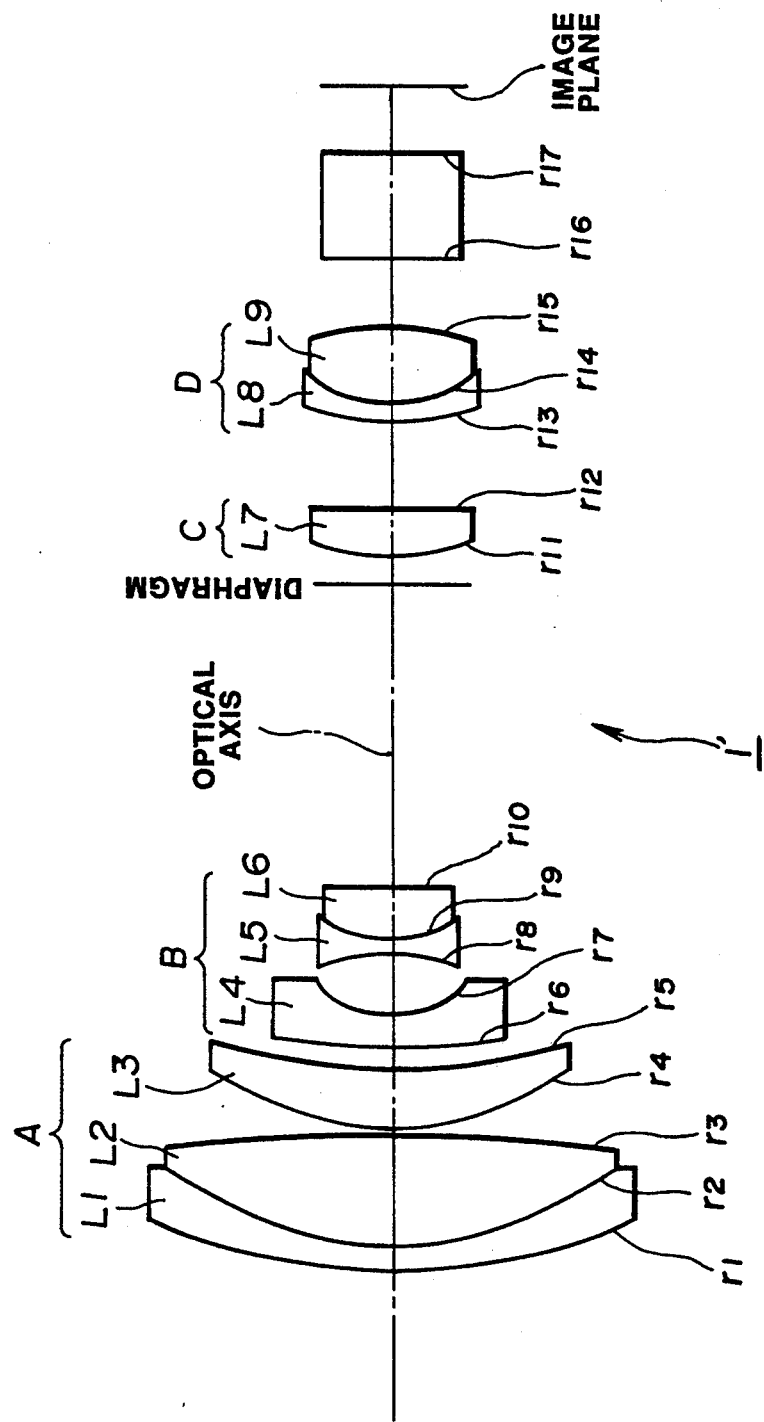
FIG. 5 is a schematic view showing a zoom lens according to a second embodiment of the present invention.
Figure 6A:
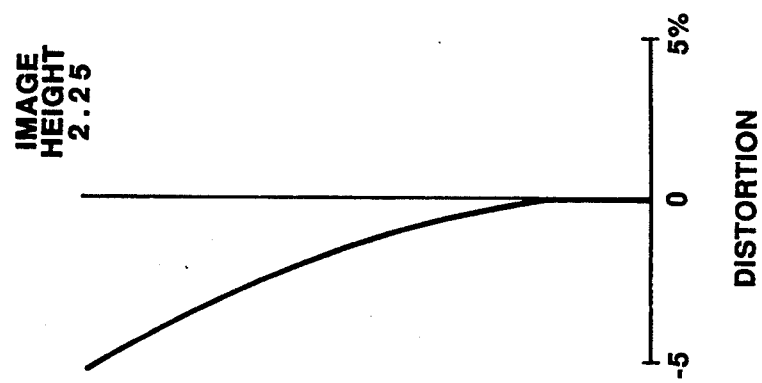
FIGS. 6A, 6B and 6C are graphs showing aberration curves of the zoom lens shown in FIG. 5, when the focal length f of the zoom lens is 5.3.
Figure 6B:
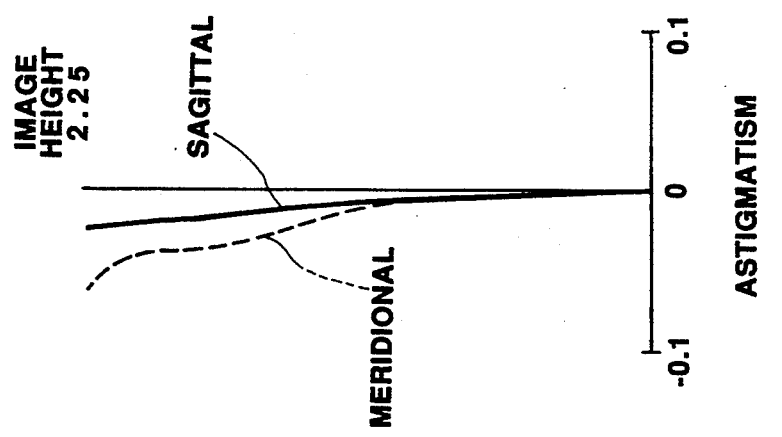
Figure 6C:
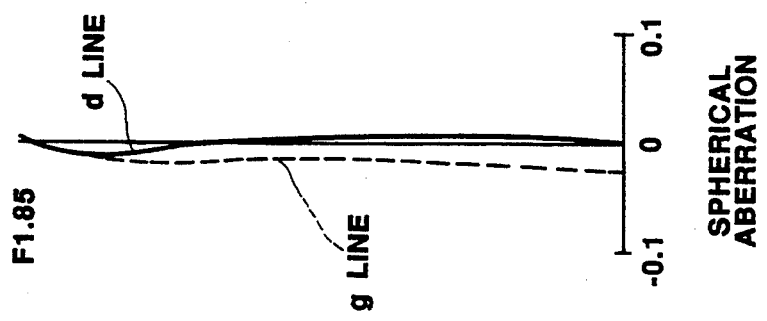
Figure 7C:
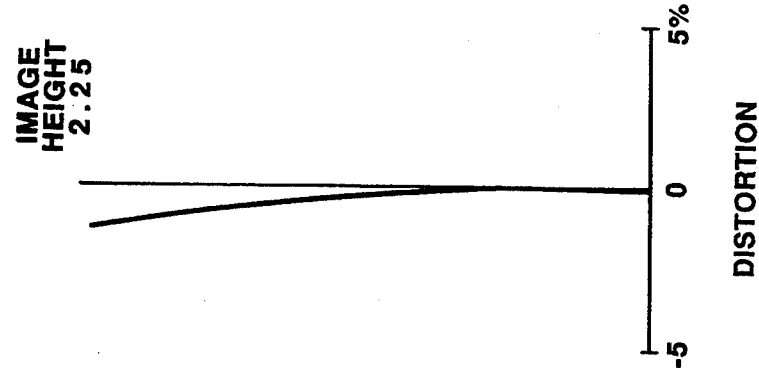
FIGS. 7A, 7B and 7C are graphs showing aberration curves of the zoom lens shown in FIG. 5, when the focal length f of the zoom lens is 19.14.
Figure 7B:
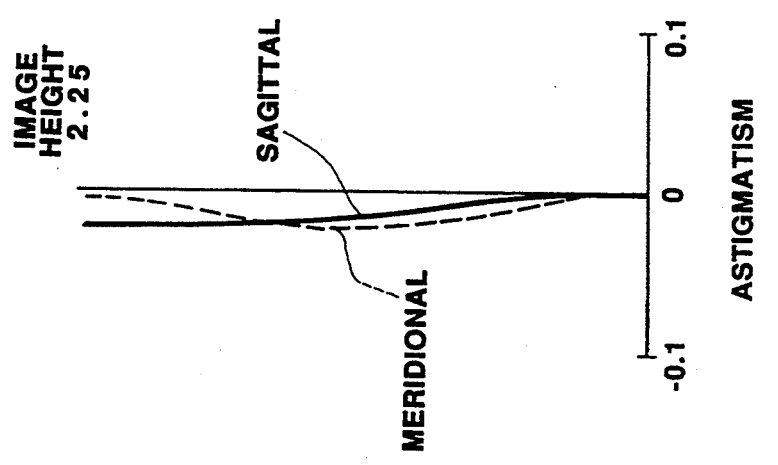
Figure 7A:
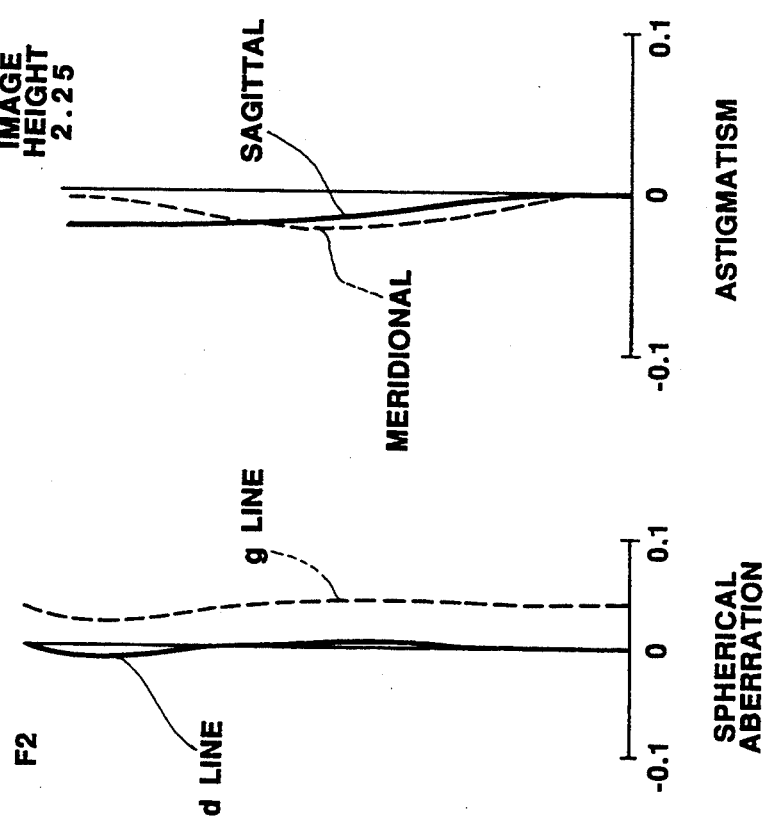

FIG. 5 shows a zoom lens 1' according to a second embodiment of the present invention. In the zoom lens 1', the image side surface (r5) of the third lens L3 is aspherical. In other respects, the zoom lens 1' is substantially identical to the zoom lens 1 shown in FIG. 1.

Table 4 below is a listing of asphericity coefficients of the image side surface (r5) of the third lens L3, the image side surface (r7) of the fourth lens L4, and the image side surface (r12) of the seventh lens L7.

TABLE 4

| Aspherical Coefficients | Bi | Ci | Di | Ei |
| --- | --- | --- | --- | --- |
| r5 surface | $-5.9 \times 10^{-7}$ | $-1.38 \times 10^{-8}$ | $+5.91 \times 10^{-11}$ | 0 |
| r7 surface | $-1.7 \times 10^{-4}$ | $+4.43 \times 10^{-5}$ | $-5.7 \times 10^{-6}$ | $+3.1 \times 10^{-6}$ |
| r12 surface | $+3.9 \times 10^{-4}$ | $-2.95 \times 10^{-5}$ | $+1.14 \times 10^{-7}$ | 0 |

TABLE 2

| r1 | 32.36 | d1 | 1 | n1 | 1.71736 | v1 | 29.5 |
| --- | --- | --- | --- | --- | --- | --- | --- |
| r2 | 14.94 | d2 | 5.76 | n2 | 1.51823 | v2 | 59 |
| r3 | 248.6 | d3 | 0.25 | | | | |
| r4 | 15.27 | d4 | 4.26 | n3 | 1.492 | v3 | 56 |
| r5 | 81.18 | d5 | variable | | | | |
| r6 | 94.84 | d6 | 1.3 | n4 | 1.492 | v4 | 56 |
| r7 | 4.05 | d7 | 3.17 | | | | |
| r8 | −11.76 | d8 | 0.7 | n5 | 1.67270 | v5 | 32.2 |
| r9 | 5.8 | d9 | 2.37 | n6 | 1.84666 | v6 | 23.8 |
| r10 | −143.6 | d10 | variable | | | | |
| r11 | 8.98 | d11 | 2.26 | n7 | 1.492 | v7 | 56 |
| r12 | −31.65 | d12 | variable | | | | |
| r13 | 23.17 | d13 | 0.7 | n8 | 1.84666 | v8 | 23.8 |
| r14 | 5.78 | d14 | 3.1 | n9 | 1.67790 | v9 | 50.6 |
| r15 | −14.87 | d15 | variable | | | | |
| r16 | ∞ | d16 | 4.6 | n10 | 1.51680 | v10 | 64.2 |
| r17 | ∞ | | | | | | |

TABLE 3

| Overall Focal Length | d5 | d10 | d12 | d15 |
| --- | --- | --- | --- | --- |
| 5.3 | 1 | 16.52 | 2.75 | 3.519 |
| 15.47 | 10.5 | 7.02 | 1.207 | 4.882 |
| 30.8 | 14.92 | 2.6 | 2.946 | 3.143 |

In these tables, ri is a radius of curvature of the ith surface from the object side, di is a distance between the ith surface and the (i+1)st surface. The surfaces r16 and r17 are surfaces of a plane parallel glass of a reference thickness corresponding to a low pass filter, an infrared cut filter. A distance between the r17 surface and the image plane is 3.00; fA=30.71; f3=37.43; fA/f3=0.821; fB=−7.11; f4=−8.64; fB/f4=0.822; and (f3·fB)/(f4·fA)=1.00.

Figure 2C:
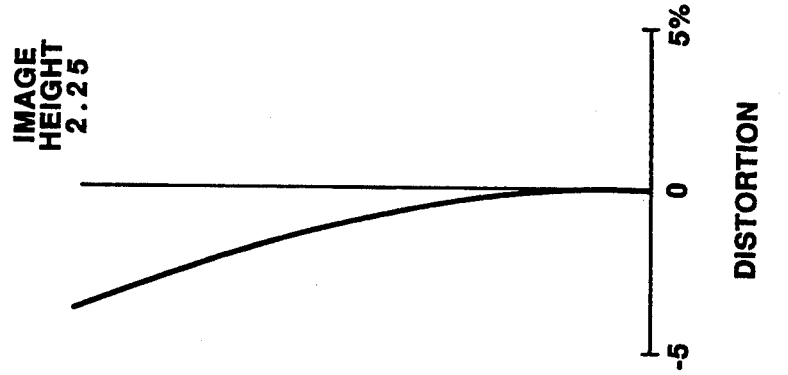
FIGS. 2A, 2B and 2C are graphs showing aberration curves of the zoom lens shown in FIG. 1, when the focal length f of the zoom lens is 5.3.
Figure 2B:
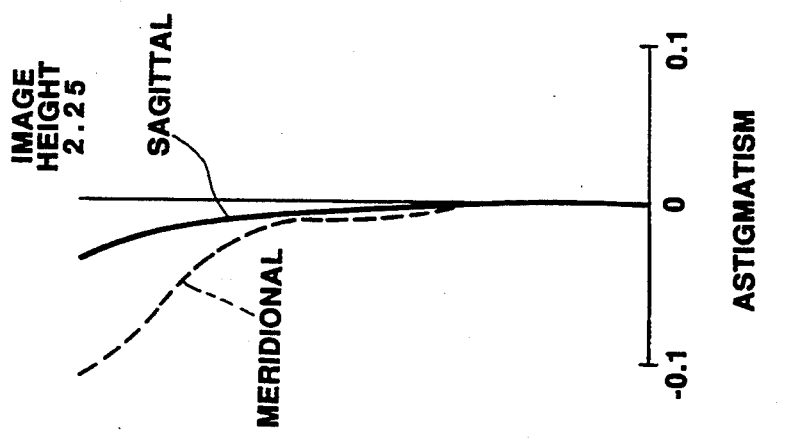
Figure 2A:
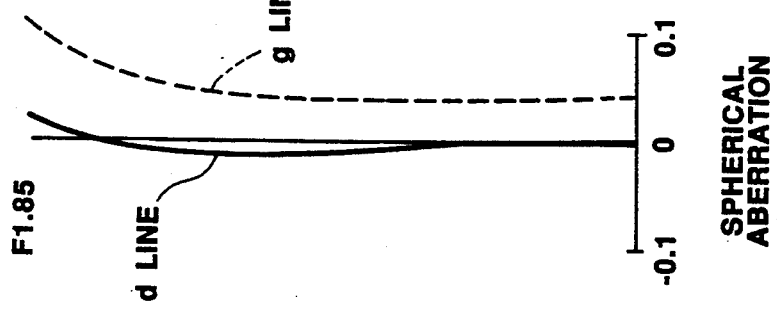
Figure 4C:
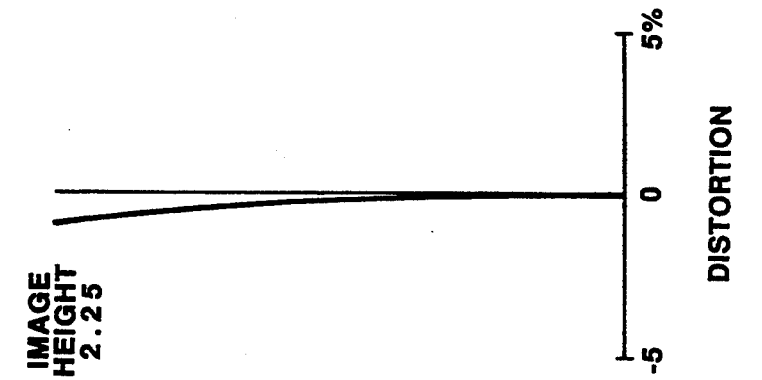
FIGS. 4A, 4B and 4C are graphs showing aberration curves of the zoom lens shown in FIG. 1, when the focal length f of the zoom lens is 30.8.
Figure 4B:
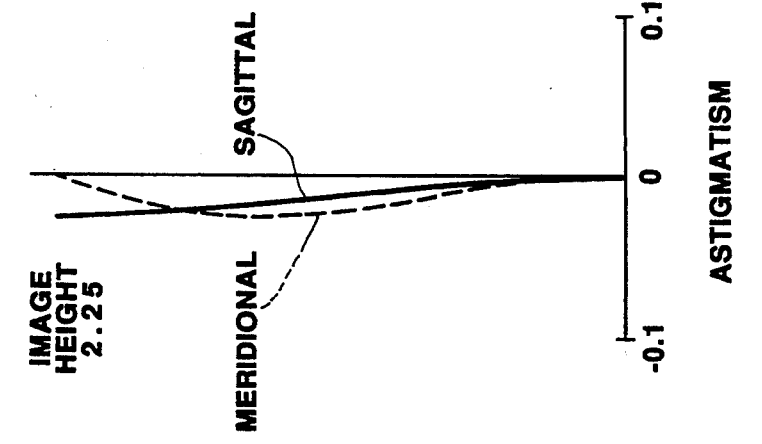
Figure 4A:
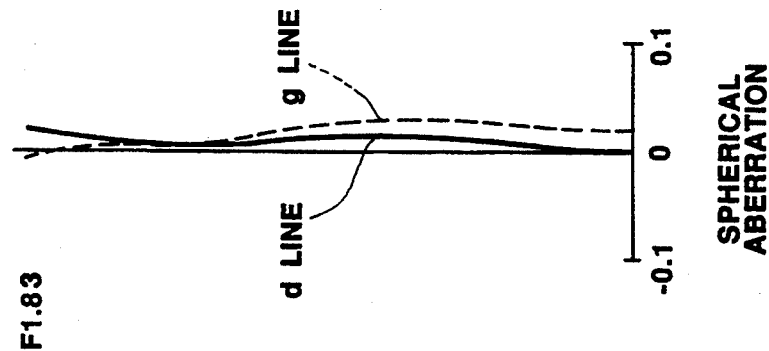

FIGS. 2–4 show aberration curves of the zoom lens 1 at different focal lengths (f=5.3, f=15.47, f=30.8) of the overall system. As shown in these graphs, the zoom lens 1 can correct the spherical aberration and other image errors satisfactorily. The first embodiment of the The following tables 5 and 6 show a concrete example according to the second embodiment of the invention. In this example, PMMA (acrylic resin) is used as plastic lens material.

TABLE 5

| r1 | 30.58 | d1 | 1 | n1 | 1.80518 | v1 | 25.5 |
| --- | --- | --- | --- | --- | --- | --- | --- |
| r2 | 17.11 | d2 | 4.92 | n2 | 1.51680 | v2 | 64.2 |
| r3 | −104.81 | d3 | 0.25 | | | | |
| r4 | 13.61 | d4 | 2.83 | n3 | 1.492 | v3 | 56 |
| r5 | 31.98 | d5 | variable | | | | |
| r6 | 38.13 | d6 | 1.3 | n4 | 1.492 | v4 | 56 |
| r7 | 4.455 | d7 | 2.96 | | | | |
| r8 | −9.18 | d8 | 0.7 | n5 | 1.72342 | v5 | 38.0 |
| r9 | 5.56 | d9 | 2.42 | n6 | 1.84666 | v6 | 23.8 |
| r10 | 237.4 | d10 | variable | | | | |
| r11 | 9.88 | d11 | 2.26 | n7 | 1.492 | v7 | 56 |
| r12 | −25.07 | d12 | variable | | | | |
| r13 | 13.27 | d13 | 0.7 | n8 | 1.84666 | v8 | 23.8 |
| r14 | 5.89 | d14 | 3.2 | n9 | 1.58913 | v9 | 61.3 |
| r15 | −15.62 | d15 | variable | | | | |
| r16 | ∞ | d16 | 4.6 | n10 | 1.51680 | v10 | 64.2 |
| r17 | ∞ | | | | | | |

TABLE 6

| Overall Focal Length | d5 | d10 | d12 | d15 |
| --- | --- | --- | --- | --- |
| 5.30 | 1 | 14.76 | 3.967 | 3.439 |
| 19.14 | 10.52 | 5.24 | 1.710 | 5.698 |
| 30.74 | 13.16 | 2.6 | 2.688 | 4.719 |

The reference thickness plane parallel glass and the distance between this glass and the image plane of this example are the same as in the example shown in Tables 2 and 3. In this example, fA=28.10; f3=45.83; fA/f3=0.613; fB=−5.80; f4=−10.38; fB/f4=0.559; (f3·fB)/(f4·fA)=1.097.

FIGS. 6A–8C show aberration curves of the zoom lens 1' at different focal lengths (f=5.30, f=19.14, f=30.74). As shown in these graphs, the zoom lens 1' can correct the spherical aberration and other image errors satisfactorily. The second embodiment of the invention can provide the zoom lens which is advantageous in cost reduction, superior in image error correction, and less susceptible to temperature changes.

Each of the first and second embodiments of the invention is also applicable to a zoom lens for a still camera such as a single lens reflex camera.

What is claimed is:

1. A zoom lens comprising;
   a first lens group having a positive refracting power, said first lens group being stationary relative to an image plane, said first lens group comprising a first cemented lens comprised of a first negative meniscus lens and one of a plano-convex and a bi-convex second lens, said first lens group further comprising a third positive meniscus lens, said second lens being located between said first and third lens, said third lens being located between said second lens and said image plane;
   a second lens group having a negative refracting power, said second lens group being movable, and comprising a negative meniscus fourth lens, and a second cemented lens comprised of a bi-concave fifth lens and a plano-convex sixth lens, said second lens group being located between said first lens group and said image plane, said fourth lens being located between said third lens and said fifth lens, said fifth lens being located between said fourth lens and said sixth lens;
   a third lens group having a positive refracting power, said third lens group being stationary relative to said image plane, and comprising one of a bi-convex and a plano-convex seventh lens, said third lens group being located between said second lens group and said image plane; and
   a fourth lens group having a positive refracting power, said fourth lens group being movable, and comprising a cemented lens of a negative meniscus eighth lens and a bi-convex ninth lens, said fourth lens group being located between said third lens group and said image plane, said eighth lens being between said seventh lens and said ninth lens;
   wherein each of said third, fourth and seventh lenses is made of plastic; and
   wherein each of said fourth and seventh lenses comprises an aspherical lens surface which is aspherical, and each of said first, second, fifth, sixth, eighth and ninth lenses is a spherical glass lens defined only by spherical surfaces.

2. A zoom lens according to claim 1 wherein said aspherical lens surface of said fourth lens is an image side back surface which faces toward said image plane, and which comprises a radial inner region and a radial outer region which is remoter from an optical axis of said zoom lens than said radial inner region and which is smaller in curvature than said radial inner region of said aspherical surface of said fourth lens, and said aspherical lens surface of said seventh lens is an image side back surface which faces toward said image plane, and which comprises a radial inner region and a radial outer region which is remoter from the optical axis than said radial inner region of said aspherical surface of said seventh lens and which is smaller in curvature than said radial inner region of said aspherical surface of said seventh lens.

3. A zoom lens according to claim 1 wherein said aspherical lens surface of said fourth lens is an image side back surface which faces toward said image plane, and which is shaped in such an aspherical form that a curvature becomes smaller than a paraxial spherical surface as a radial distance from an optical axis increases, and said aspherical lens surface of said seventh lens is an image side back surface which faces toward said image plane, and which is shaped in such an aspherical form that a curvature becomes smaller than a paraxial spherical surface as a radial distance from the optical axis increases.

4. A zoom lens according to claim 1 wherein said third and fourth lenses are identical in material.

5. A zoom lens according to claim 4 wherein said third lens is made of an acrylic resin, and said fourth lens is also made of said acrylic resin.

6. A zoom lens according to claim 1 wherein said first lens group consists only of said first, second and third lenses, said second lens group consists only of said fourth, fifth and sixth lenses, said third lens group consists only of said seventh lens, and said fourth lens group consists only of said eighth and ninth lenses, and wherein said zoom lens further comprises a diaphragm between said second and third lens groups.

7. A zoom lens comprising;
   a first lens group having a positive refracting power, said first lens group being stationary relative to an image plane, said first lens group comprising a first cemented lens comprised of a first negative meniscus lens and one of a plano-convex and a bi-convex second lens, said first lens group further comprising a third positive meniscus lens, said second lens being located between said first and third lenses, said third lens being located between said second lens and said image plane;
   a second lens group having a negative refracting power, said second lens group being movable, and comprising a negative meniscus fourth lens, and a second cemented lens comprised of a bi-concave fifth lens and a plano-convex sixth lens, said second lens group being located between said first lens group and said image plane, said fourth lens being located between said third lens and said fifth lens, said fifth lens being located between said fourth lens and said sixth lens;
   a third lens group having a positive refracting power, said third lens group being stationary relative to said image plane, and comprising one of a bi-convex and a plano-convex seventh lens, said third lens group being located between said second lens group and said image plane; and
   a fourth lens group having a positive refracting power said fourth lens group being movable, and comprising a cemented lens of a negative meniscus eighth lens and a bi-convex ninth lens, said fourth lens group being located between said third lens group and said image plane, said eighth lens being between said seventh lens and said ninth lens;
   wherein each of said third, fourth and seventh lenses is made of plastic;
   wherein said third and fourth lenses are identical in material; and
   wherein said first and second lens groups, and said third and fourth lenses have focal lengths which satisfy the following three conditions;
   (1) $0.4 < fA/f3 < 1$
   (2) $0.4 < fb/f4 < 1$
   (3) $0.7 < f3 \cdot fB/f4 \cdot fA < 1.4$
   where fA is a focal length of the first lens group, fB is a focal length of the second lens group, f3 is a focal length of the third lens, and f4 is a focal length of the fourth lens.

* * * * *